United States Patent
Padole et al.

(10) Patent No.: US 7,506,382 B2
(45) Date of Patent: *Mar. 17, 2009

(54) METHOD AND SYSTEM FOR LICENSING A SOFTWARE PRODUCT

(75) Inventors: Arvind Padole, Redmond, WA (US); Eric Wong, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 663 days.

This patent is subject to a terminal disclaimer.

(21) Appl. No.: 11/138,800

(22) Filed: May 26, 2005

(65) Prior Publication Data

US 2005/0216420 A1 Sep. 29, 2005

Related U.S. Application Data

(63) Continuation of application No. 09/818,156, filed on Mar. 27, 2001, now Pat. No. 6,993,664.

(51) Int. Cl.
*G06F 21/00* (2006.01)

(52) U.S. Cl. ...................................... 726/30
(58) Field of Classification Search ............... 705/59; 726/30
See application file for complete search history.

(56) References Cited

U.S. PATENT DOCUMENTS

| | | | | |
|---|---|---|---|---|
| 5,553,139 A * | 9/1996 | Ross et al. | ...................... | 705/59 |
| 6,009,401 A * | 12/1999 | Horstmann | ...................... | 705/1 |
| 6,108,420 A * | 8/2000 | Larose et al. | ................... | 705/59 |
| 6,169,976 B1 * | 1/2001 | Colosso | ........................ | 705/59 |
| 6,460,140 B1 * | 10/2002 | Schoch et al. | ................. | 726/22 |

OTHER PUBLICATIONS

*Online to Lotus*; S. Moores; *PC User*, (Dec. 1986) n. 55, pp. 70-72.
*Software license management with smart cards*; T. Aura and D. Gollman; *Proceedings of the USENIX Workshop on Smartcard Tehcnology*, 1999, pp. 75-85.
U.S. Official Action dated Aug. 24, 2004 in U.S. Appl. No. 09/818,156.

* cited by examiner

*Primary Examiner*—Kambiz Zand
*Assistant Examiner*—Andrew L Nalven
(74) *Attorney, Agent, or Firm*—Merchant & Gould

(57) ABSTRACT

A method and system for activating and obtaining a license for a software product is disclosed. A local license is obtained from a storage medium of the software product and is stored with the software product on a user's computer. The local license allows for one of multiple license types to be activated from a single software product. The user enters a product key containing a channel ID. The compact disk or other storage medium is searched for the appropriate local license for the channel ID. The local license includes a MSIID, a channel ID range for each supported license type, a license type for each channel id range, and an optional product expiration date for the license type. The license type is determined by looking up the product key's channel id in the local license's channel id range table. If activation is required based on the license type, then an installation ID including a product ID (PID) and a hardware ID (H/W ID) are transmitted to an activation authority. The activation authority uses the PID to determine whether the software product has been activated before and uses the channel ID to determine the type of backend license to grant. If the PID is found in the database, the activation authority applies various unlocking rules to determine whether or not the backend license should be issued and, if so, the he activation authority transmits a backend license.

17 Claims, 3 Drawing Sheets

METHOD AND SYSTEM FOR LICENSING A SOFTWARE PRODUCT

CROSS-REFERENCE TO RELATED APPLICATION

This is a Continuation of application Ser. No. 09/818,156 filed Mar. 27, 2001 and hereby incorporated herein by reference.

TECHNICAL FIELD

The invention generally relates to a method and system for licensing and activating a software product.

BACKGROUND

Computer software is a unique consumer product in that the same product can be replicated many times after being sold. Once a software product is sold, typically as software code on a computer-readable disk, the purchaser can easily copy the code to other computer-readable media thereby replicating the same product many times over.

This characteristic of software can be a tremendous benefit in terms of lowering manufacturing costs and facilitating distribution. For instance, easy replication allows a software manufacturer to distribute one physical copy of the software product and sell a multi-seat license that legally empowers the purchaser to install the software product on many different computers.

Unfortunately, this benefit comes at a cost of open abuse. One well-known abuse is piracy. An unscrupulous party can obtain a copy of the object code (legally or illegally) and then illicitly replicate and resell pirated copies of the product. Software companies attempt to monitor piracy activities, but detection is often difficult. Moreover, even when improper activity is detected, enforcement and legal recourse is often unavailable from a practical standpoint, particularly since much of the abuse occurs in foreign lands.

The computer software industry estimates billions of dollars are lost each year due to piracy and other illicit uses. To eliminate some of these losses, software manufacturers may require individual licenses rather than multi-seat licenses. These individual licenses are entered into before allowing a software product to operate. A user installing a software product with an individual license typically needs to activate the software product and license before using the software product.

Activation of the software product may be accomplished by telephoning a customer service representative and verbally transmitting a product ID and a H/W ID (some information regarding the user's computer hardware). In return, the customer service representative verbally transmits a confirmation ID for the user to enter into his computer to activate the software product. Alternatively, the software product may be activated without telephoning a customer service representative, such as through an Internet connection to an activation server.

Although these software product licenses work fairly well, there are some problems. One problem is that a hacker may attempt to circumvent the activation process and activate a software product without a valid license.

Accordingly, there remains a need for improved technology solutions to combat piracy and illicit use of software products by providing licenses on a temporary and permanent basis, while recognizing and accommodating the needs and practices of a legitimate purchaser.

SUMMARY OF THE INVENTION

The present invention meets the above-described needs by providing a method and system for activating and obtaining a license for a software product. A local license is obtained from the storage medium of the software product and is stored with the software product on the user's computer. The local license allows for one of multiple license types to be activated from a single software product. Which license type is eventually activated for the software product depends on a product key that is entered by the user during installation. Typically, the product key is located in the box that contains the software product or on the software product itself, such as on the compact disk. The product key is a "secure" representation of the product ID (PID) but both contain similar content, just in different formats.

The user enters the product key which contains a channel ID. The compact disk or other storage medium is searched for the appropriate local license containing product activation rules for the channel ID. The local license includes a MSIID, a channel ID range for each supported license type, a license type for each channel ID range, and an optional product expiration date for the license type. The license type is determined by looking up the product key's channel ID in the local license's channel ID range table. Based on the license type, it is determined whether activation is required.

If activation is required based on the license type, then an installation ID including a product ID (PID) and a hardware ID (H/W ID) are transmitted to an activation authority. The PID is generated from the product key and typically includes a backend product code (BPC), the channel ID, a sequence number and a random number.

The activation authority uses the PID to determine whether the software product has been activated before and uses the channel ID to determine the type of backend license to grant. If the PID is found in the database, the activation authority applies various unlocking rules to determine whether or not the license should be issued.

The activation authority transmits to the user a backend license. The backend license includes the backend product code (BPC), an optional license expiration date, a hardware ID, a PID, a license ID, an issue date, and a signature. The BPC is used to identify the product, such as "OFFICE PRO" or "OFFICE SBE". The expiration date is used to identify the duration of the license. The H/W ID ties the license to the user's computer. The PID ties the license to the current installation of the software product. The license ID and issue date are used by the activation authority when the user connects to the activation authority again, such as for renewal of the license.

That the invention improves over the drawbacks of prior art and accomplishes the advantages described above will become apparent from the following detailed description of the exemplary embodiments and the appended drawings and claims.

DETAILED DESCRIPTION OF EMBODIMENTS OF THE INVENTION

An embodiment of the present invention will be incorporated into the "OFFICE 10" suite of program modules marketed by Microsoft Corporation of Redmond, Wash. Briefly described, in one embodiment, the invention is a method and system for activating a software product through a number of different license types. The present invention prevents users from using unlicensed copies of a software product while supporting a number of different license types.

Before describing embodiments of the present invention, a description of an exemplary personal computer system on which a software product may be installed and activated with a software license will be provided below in reference to FIG. 1. Following the description of FIG. 1 is a detailed description of providing a license for a software product in accordance with an embodiment of the present invention.

Figure 1:
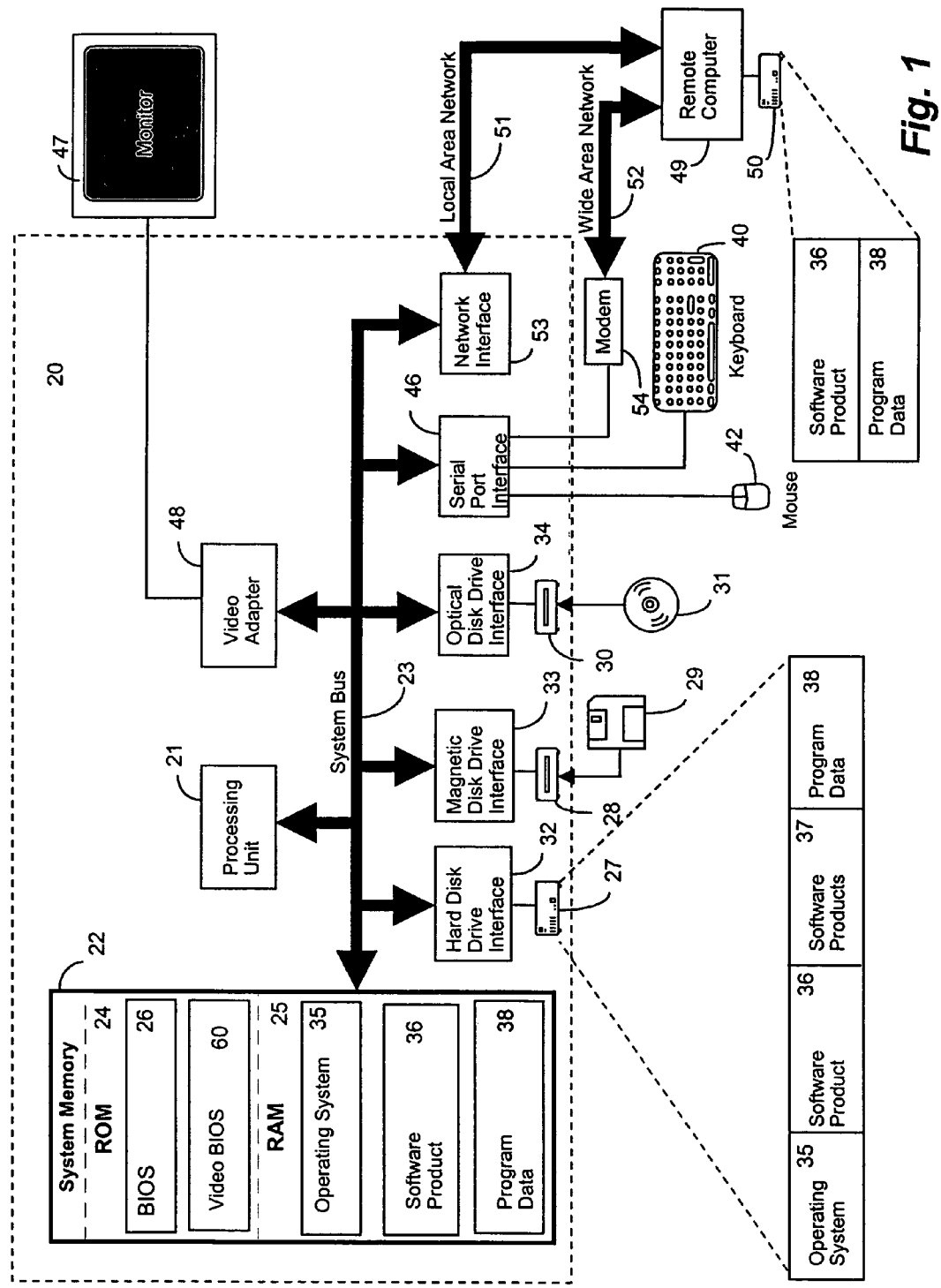
FIG. 1 is a block diagram of an exemplary personal computer system on which a software product may be installed and activated with a license.

FIG. 1 and the following discussion are intended to provide a brief, general description of an exemplary personal computer system on which a software product may be installed and activated with a license. Those skilled in the art will recognize that software products may include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, software products may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. A video BIOS 60 may also be stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of software products may be stored in the drives and RAM 25, including an operating system 35, a software product 36, such as Microsoft's "OFFICE 10" suite of application program modules, other software products 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Providing A Software License

As described above in the Background, delivering secure and flexible licenses for a software product has been problematic in the past due to numerous reasons.

In one embodiment of the present invention, the invention includes a local license stored with the software product. The local license allows for one of multiple license types to be activated from a single software product. Which license type is eventually activated for the software product depends on a product key that is entered by the user. Typically, the product key is located in the box that contains the software product or on the software product itself, such as on the compact disk.

Generally described, in one embodiment, the present invention comprises a system for activating and licensing a software product that comprises two different licenses: a local license and a backend license. The local license includes the activation rules for the software product and the backend license (obtained after activation) grants the user perpetual or temporary rights to the software product. When installing the software product, the user enters a product key, typically obtained on the software product's box or on the CD containing the software product. Data derived from the product key is part of a product ID (PID). Another part of the product ID is the backend product code (BPC) found in the software product itself. The software product generates its PID from the product key and the BPC.

The PID includes a channel ID (typically indicating the commercial channel through which the software product was obtained such as retail, Beta test, promotional, etc.). The local license contained in the software product includes a channel ID range table. The channel ID is cross-referenced with the channel ID range table to determine whether the software product needs to be activated. If so, then an installation ID is generated for the software product. Typically, the installation ID comprises the PID and the hardware ID (H/W ID). The hardware ID identifies the hardware components of the computer so that the software product is tied to the computer and may not be installed on multiple computers.

The installation ID is transmitted to the activation authority and it is determined whether the PID has been used before. If not, then a backend license is generated and transmitted to the user. If the PID has been used before, unlocking rules are used to determine whether to send a backend license. Typically, the unlock mechanism looks at the BPC, channel ID, country and count to decide whether a backend license may be transmitted. These unlocking rules will be described in more detail below.

Before describing other embodiments of the present invention, several key terms will be described below: license types, local license, product ID, and backend license.

License Types

In a preferred embodiment of the invention, there are several different license types that may be granted for a software product: activation, subscription, trial, voluntary or free. An activation license requires the software product to be activated before use (although it may operate a few times initially before locking itself) and then does not require that the license be renewed. A subscription license is for a limited time period with an expiry date. A trial license allows free use of the software product for a limited period of time. A voluntary license allows the software product to operate (without activation) although the user may activate the software product to receive information about product upgrades, other products, etc. A free license does not require a license fee or activation of the software product. In one embodiment of the present invention, the installation ID is of variable length depending upon the license type: activation, subscription, trial, voluntary or free.

Local License

In one embodiment, the local license file may comprise a MSIID, a channel ID range table, license types, an expiry date (such as for Beta releases of a software product), and a backend product code (BPC). The local license file is tied to a particular software product so that the local license file may not be used with a separate product.

The local license file is associated with one and only one product by adding a Microsoft Software Installer identifier (MSIID) to the local license file. The MSIID is an identification number that is used to identify a product by characterizing the files that are associated with the media on which the software originally resides (e.g., the compact disk). The MSIID may, for example, be generated by "hashing" the files on a CD containing a software product or by any other means for associating the MSIID with the particular, licensed software product.

At set-up, the user typically inserts the software media and runs a set-up program. The set-up program will usually require that the user enter a product key (e.g., sticker on the CD) associated with the software media. Once the product key has been entered, the set-up program will transfer the appropriate files from the software media to the user's hard drive. The set-up program will then generate the MSIID based on the contents of the media and will check the generated MSIID against the MSIID stored in the local license file on the same media. This is to verify that the local license on the media was not tampered with prior to installation. If there is a match, the local license file from the media is tied to the hardware ID (H/W ID) of the computer on which the software product is being installed. The resulting signature and the H/W ID will be stored in a hardware signature file. If there is not a match, then the installation will be halted and the user will be informed of the inability to install the software product.

At run time, a signature of the local license file and the H/W ID is computed and compared against the one in the hardware signature file. This comparison is done to verify that the local license was not tampered with after installation was completed. If there is a match, it is assumed that the local license belongs to the installed product and a user can use the software product. If there is not a match, a user will be prompted to repair the software product. The repair will re-cache the local license from the original media and recreate the hardware signature file in exactly the same way as was done during set-up (after verification that the local license on the media is valid).

For a more detailed description of the MSIID, see U.S. patent application Ser. No. 09/755,433, filed Jan. 5, 2001, entitled "Electronic Software License with Software Product Installer Identifier", commonly assigned and incorporated by reference herein.

Product ID (PID)

In a preferred embodiment, the product identifier, or PID, comprises a 5 digit backend product code (BPC), a three digit channel ID, a seven digit sequence number and a 5 digit random number. Typically, the PID is generated from the product key and the BPC that is found in the software product itself.

The BPC is used at the customer's computer to verify the license from the activation authority, meaning the BPC value of the license and the product must match. The BPC is used at the activation authority to determine the validity and product.

The channel ID is used at the activation authority to determine the license type and the expiration date. Typically, the channel ID indicates the channel through which the software product was obtained (such as OEM, retailers, donation). The channel ID is used at the user's computer to look up the license type in the local license.

The PID is typically combined with a H/W ID to form an installation ID that is sent to an activation authority to obtain a backend license for the software product. The H/W ID identifies the components of the user's computer so that the software product may not be copied to different computers (with different H/W IDs).

Backend License/Confirmation ID

Typically, the present invention includes a backend license sent from the activation authority to the user's computer or the user. The confirmation ID is the verbal representation of the backend license used for telephone registration. Once entered by the user, the confirmation ID is converted to a "machine-readable" form like the backend license received via Internet activation. Though not as obvious, Internet activation also transforms the backend license into various representations depending on the protocols and networks it travels through from the activation authority to the user's machine. The confirmation ID/backend license comprises a PID, H/W ID, license ID, issue date, expiry date, issue day, renewal flag, H/W ID flag, clock flag, and a signature.

The license ID is an activation authority generated serial number. This serial number and the issue date uniquely identify the license in the activation authority database. To reduce the number of bits in the telephone license, the license ID is limited to 27 bits (issue date to 7 bits) in a preferred embodiment.

The issue date is the number of months since January 2000. Thus, for example, all licenses issued in the month of August 2000 will have an issue date of 8.

The expiry date is the number of months since the issue date when the license will expire. The actual expiry date will be the last day of the expiry month, which is (issue date+ expiry date) months since January 2000. For example, if the issue date is 8 and the expiry date is 6, then the actual expiry date will be Feb. 28, 2001 (the last day of 6+8 months from January 2000).

The signature is used to verify that the confirmation ID/backend license is from a valid source (such as the activation server) and has not been tampered with. The issue date specifies a particular month in which the license is issued. On the other hand, the issue day is the current day in the month. The renewal flag indicates a renewed license. The H/W ID flag and the clock flag are used by the product to enable/disable various validations on the client.

Exemplary Anti-piracy System

Figure 2:
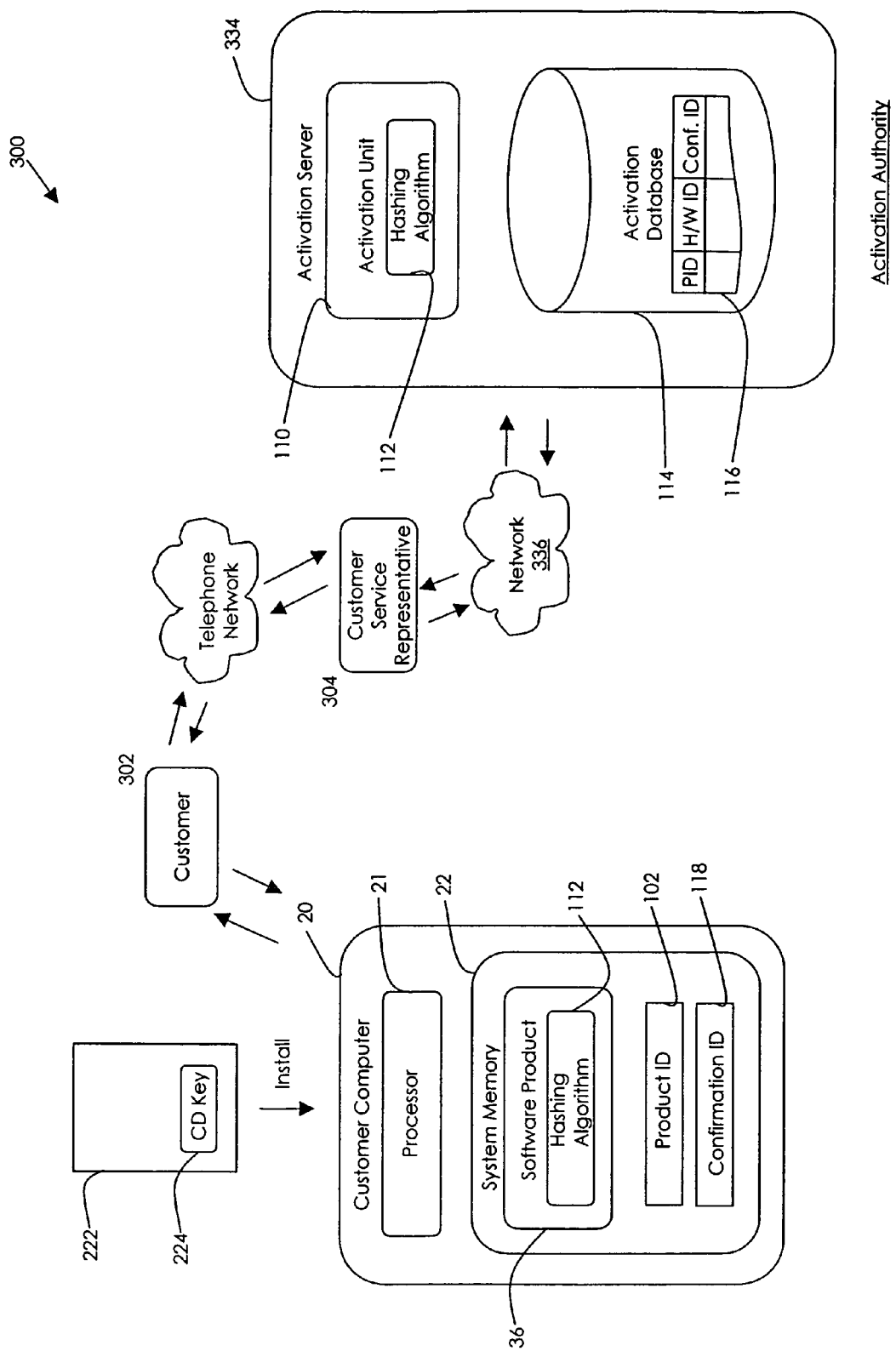
FIG. 2 illustrates an exemplary anti-piracy system that facilitates activation and licensing of a software product with an activation authority so that the software product may be installed and used on a particular computer.

FIG. 2 illustrates an exemplary anti-piracy system 300 that facilitates activation and licensing of a software product with an activation authority so that the software product may be installed and used on a particular computer 20. The system 300 includes a customer computer 20 and an activation server 334, which resides at the activation authority remote from the customer. The system 300 also includes a customer 302 entering information into the computer 20 and connected via telephone to a customer service representative 304. The customer service representative 304 operates a computer that is interconnected to the activation server 334 by a network 336 to provide data communication. Of course, alternatively, the customer's computer 20 may be directly connected to the network 336 and activation server 334 so that the customer does not need to telephone the customer service representative 304.

For discussion purposes, the customer computer is described as a personal computer, such as a desktop or portable computer. However, as used herein, the term "computer" is intended to mean essentially any type of computing device or machine that is capable of running a software product, including such devices as communication devices (e.g., pagers, telephones, electronic books, electronic magazines and newspapers, etc.) and personal and home consumer devices (e.g., handheld computers, Web-enabled televisions, home automation systems, multimedia viewing systems, etc.). Within the described context, the network 336 is representative of an Internet or intranet, or a local or wide area network. However, the network 336 may be implemented in many different forms, including both wire-based networks (e.g., cable, telephone, fiber optic, etc.) and wireless networks (e.g., RF, satellite, microwave, etc.)

In one embodiment of the present invention, the invention includes a local license stored with the software product. The local license allows for one of multiple license types to be activated from a single software product. Which license type is eventually activated for the software product depends on a product key that is entered by the user. Typically, the product key is located in the box that contains the software product or on the software product itself, such as on the compact disk. A method for activating the software product will be described below.

With reference again to FIG. 2, the customer 302 purchases a software product for running on the computer 20. In this illustration, the software product is in the form of a shrink-wrap product 222 having a software program stored on a transportable computer-readable medium, such as a CD-ROM or floppy diskette. In other implementations, the software product may be delivered electronically over a network. The customer loads the software product onto the computer 20 as a software product (program) 36 stored in system memory 22.

During installation, the customer is prompted to enter a product key printed on label 224 of the shrink-wrap package. The customer enters the product key which is associated with the software product 36 and the product key forms part of the product ID. Additionally, another portion (BPC) of the product ID is already included in the software product 36 and the software product combines the two portions, along with other information, into a product ID that is unique to the specific installation.

The product key also contains a channel ID. The compact disk or other storage medium on which the software product is stored is searched for the appropriate local license for the channel ID. The local license includes a MSIID, a channel ID range for each supported license type, a license type for each channel id range, and an optional product expiration date for the license type. The license type is determined by looking up the product key's channel id in the local license's channel id range. Based on the license type, it is determined whether activation is required.

If activation is required, the customer registers the software product with the activation authority via the telephone or by connecting the computer directly to the activation server via a network 336. The activation authority might be, for example, the product manufacturer or an authorized third party. The activation process forces the customer to register the software product for installation and use on a specific computer.

In order to activate the software product, the following steps typically occur. The software product 36 obtains its product ID 102, such as by combining the product key entered by the user with the portion (BPC) of the product key stored in the software product. As an example, the product ID may comprise a 5-digit BPC (backend product code) value for the software product, a 3-digit channel ID indicating a place of manufacture, and a 7-digit serialized number.

The software product 36 generates a hardware ID (H/W ID) that identifies a set of hardware components that make up the customer's computer 20. The hardware ID is a multi-bit value having at least one bit representing each of the corresponding system components. As an example, the software product generates a 5-bit hardware ID that includes a single bit for each of five system components: BIOS 26, VBIOS 60, RAM 25, hard disk drive 27, and floppy disk drive 28. A bit for a given system component can be derived in different ways, such as performing a modulo operation on a chunk of the BIOS, or on the hard disk drive's serial number.

It is noted that other hardware components may be used. For instance, many computers are equipped with a network card with a unique 128-bit address. A bit for the hardware ID can be derived from this global network card address. Moreover, more than, or fewer than, five system components may be used to derive the hardware ID.

The software product concatenates the product ID with the hardware ID to produce an installation ID, and displays the value to the user. In one embodiment, the software product supports an activation pilot with a graphical user interface (UI) dialog window asking the customer to call a customer service representative at the activation authority. The UI window lists the installation ID (product ID plus the hardware ID), and includes an entry box to enter the confirmation ID given by the customer service representative over the phone. Alternatively, the customer may connect his computer to the activation authority via a network and the installation ID may be transmitted without using a customer service representative.

The activation authority uses the PID to determine whether the software product has been activated before and uses the channel ID to determine the type of backend license/confirmation ID to grant. If the PID is found in the database, the activation authority applies various unlocking rules to determine whether or not the license should be issued based upon how many times the license has been unlocked before.

The activation server 334 has an activation unit 110 to assign a backend license/confirmation ID to the software product on the customer's computer. The activation unit 110 computes the confirmation ID from the installation ID (product ID and the hardware ID). In the illustrated implementation, the activation unit 110 employs a hashing algorithm 112 to compute a hash value of the concatenated product ID and hardware ID. The backend license includes the backend product code (BPC), an optional license expiration date, a hardware ID, a PID, a license ID, an issue date, and a signature. The BPC is used to identify the product, such as "OFFICE PRO" or "OFFICE SBE". The expiration date is used to identify the duration of the license. The H/W ID ties the license to the user's computer. The PID ties the license to the current installation of the software product. The license ID and issue date are used by the activation authority when the user connects to the activation authority again, such as for renewal of the license. The activation server 334 also maintains a database 114 to store the product ID, hardware ID, and confirmation ID/backend license. The database 114 may also comprise optional customer information (e.g. name, address, phone number, etc.) provided by the customer at the time of activation. Preferably, these IDs are correlated in a table or other data record 116.

The activation server 334 returns the backend license/confirmation ID over the network 336 to the customer's computer. The confirmation ID/backend license 118 is stored locally in the system memory 22 of the customer computer 20, where it is accessible by the software program 36. The program 36 is also equipped with the same hashing algorithm 112 as found in the activation unit 110 at the activation server 334.

Exemplary Activation Scenario

An exemplary activation scenario in accordance with an embodiment of the present invention will be described below:

1. User inserts software CD in new computer, enters product key when prompted, software product is installed.
2. User runs any application of the software product and the application initiates licensing.
3. Licensing code enumerates products that contain the application being run, each product's local license (which is part of the software itself) is validated, a product is selected (automatically if there's one product, manually by user if there's more than one) from among the valid product local licenses.
4. If selected product needs activation or subscription (no valid BPC license in license store and based on the data in the local license, user is presented with appropriate user interface (UI) in order to perform activation or subscription.
5. Backend (activation authority) receives data from client (BPC, PID, H/W ID, etc.), validates the data, and generates BPC license.
6. With successful activation or subscription, a BPC license is sent from activation authority and saved in the license store.
7. Quit app(s) and return to step 2.

It should be understood that at step 4, the user can choose telephone activation or Internet activation. In the case of telephone activation, a UI displays the telephone number to call (based on the country/region selected by the user) and the Installation ID. The user reads the Installation ID to the customer service representative (CSR) who enters it in the CSR Tool. The CSR Tool is a web-based tool which sends the installation id to the activation server and displays the confirmation ID generated by the activation server. The CSR reads the confirmation ID to the user who enters it in the UI to complete the activation process.

If the user selects Internet activation, the UI connects to the activation server to get the backend license (provided the user's machine has the internet connectivity).

Unlocking Rules

The primary purpose of the unlocking rules is to restrict the number of unlocks issued against a product key which is used for various scenarios like new installation or reinstallation. Unlocking rules play a very significant role because there is no completely effective way to distinguish between a reinstall on a machine from a fresh install on another machine. Unlocking rules allow the setting of an unlock limit based on various combinations of the BPC, channel ID and country. The unlock limit is the number of unlocks which can be issued against a PID over the Internet or telephone modes without requiring a customer service representative (CSR) or supervisor override.

Two types of unlock limits for a PID will be described below: Reissue with HWID in tolerance (RIT Unlock Count) and Reissue with HWID out of tolerance (ROT Unlock Count).

The RIT Unlock Count is the maximum number of reissues (of a backend license) allowed (without override) when the H/W ID received is within tolerance or an exact match with the official H/W ID for the PID stored by the activation authority.

The ROT Unlock Count is the maximum number of reissues (of a backend license) allowed (without override) when the H/W ID received is out of tolerance with the official H/W ID for the PID stored by the activation authority. This typically dictates the number of machines you can install the software product on.

It should be understood that these unlocking limits may be set based on finding the BPC, channel ID and country in an unlock master table, while exceptions to these unlocking limits can be specified in an unlock exception table.

Figure 3:
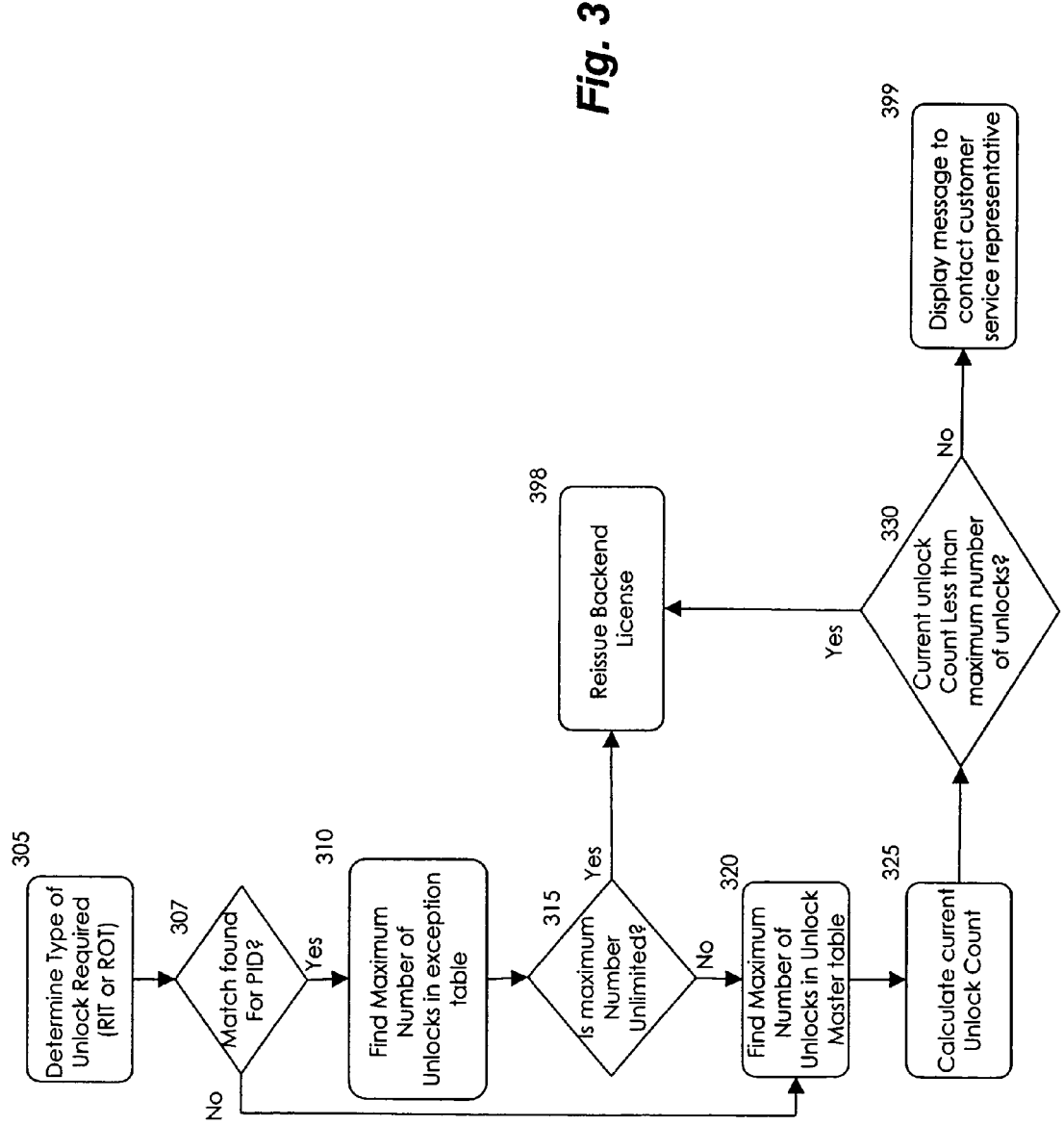
FIG. 3 is a flow diagram illustrating a method for determining the unlocking limits of a backend license in accordance with an embodiment of the present invention.

A method for determining the unlocking limits will be described below in reference to FIG. 3. The type of unlock rule required (RIT or ROT) is determined at step 305. The type of unlock rule that is required is determined based on the scenario, e.g., if the HWID is in tolerance then use RIT count, otherwise the ROT count is used. The unlock exception table is searched to determine whether a match is found for the PID received in the installation ID (step 307). If so, the maximum number of reissues (unlocks) is found at step 310 and the method proceeds to step 315. However, if a match is not found in the unlock exception table, then the method proceeds to step 320.

At step 315, it is determined whether the maximum number of unlocks is unlimited. If so, then it is OK to reissue the backend license (step 398). If not, then the method proceeds to step 320.

At step 320, the unlock master table is searched to determine the maximum number of RIT unlocks allowed and the maximum number of ROT unlocks allowed. The unlock master table is searched for an exact match for country, BPC, and channel ID combination of the received PID. If an exact match is not found, then the unlock master table is searched for an exact match for the country and channel ID combination (i.e. for any BPC). If an exact match is not found, then the unlock master table is searched for an exact match for the BPC and channel ID combination (i.e. for any country). If an exact match is not found, then the unlock master table is searched for an exact match for the channel ID (i.e. for any BPC and country). If an exact match is not found, then the unlock master table is searched for an exact match for the BPC (i.e. for any channel ID and country). If an exact match is not found, then a message is returned to the customer to contact a customer service representative in case of Internet activation. For telephone activation, similar message is given to the CSR with the option to override. CSR determines the legitimacy of the user (e.g CSR may ask the user to give a proof of purchase) and overrides the request if required. In case of override, activation server bypasses the unlock rules and issues the confirmation id.

At step 325, the current RIT unlock count or current ROT unlock count is determined based on the unlock type required. Typically, the current RIT unlock count is equal to the count of the partial PID in the license data table when the license type is RIT. The partial PID comprises the BPC, channel ID and sequence number of the PID. The license data table comprises information about all of the licenses issued against a PID. Typically, the current ROT unlock count is equal to the count of the partial PID in the license data table when the license type is ROT.

At step 330, it is determined whether the current count (calculated at step 325) is less than the maximum count allowed (calculated at step 320). If so, then the method proceeds to step 398. Otherwise, the method proceeds to step 399.

CSR Override Mechanism

In one embodiment of the present invention, the customer service representative (CSR) or a supervisor has the capability to override a failed request for a license (i.e. to bypass the validation which caused the request failure and complete the transaction successfully).

CSR Search Mechanism

In one embodiment of the present invention, a customer service representative (CSR) search mechanism allows CSRs to search the activation authority database based on various search parameters such as first name, last name, PID, etc. and see the customer records (and their license history). CSR can use search mechanism to determine the legitimacy of the user in case of override. Typically, a CSR search is divided into two separate requests which are described below.

CSR Search Summary Request

Typically, a CSR search summary request is primarily used to get summary information about each customer record in the search result. The CSR can select a particular record to get other details like license history etc. for the customer. The request processing involves the following steps: the search criteria are sent to the activation authority; the activation authority database is searched based on the search criteria; the search request is logged to a search request table (search request logging can help determine the most common search criteria used by CSRs); and the search results are sent to the CSR.

CSR Search Customer History Request

Generally, a CSR search customer history request is used when a CSR selects a customer record in a search summary result set (the records returned in the CSR Search summary request). The request processing involves the following steps: customer ID (the unique ID assigned to the customer record in the database) for the selected record is sent to the activation authority; and the activation authority returns three pieces of data to the CSR (customer information, license history, including any billing information and override information for each license).

Installation ID During Re-activation

Typically, the installation ID comprises a product ID and H/W ID. However, when re-activating or re-activating the software product, the installation ID may comprise different parts.

If the H/W ID and PID have not changed since the backend license was downloaded, that is, the H/W ID and PID are the same as those in the activation authority database, then the full PID and H/W ID need not be included in the installation ID. For these instances, the license ID and issue date are included in installation ID. If the H/W ID has changed and the PID has not changed since the backend license was downloaded, then the hardware ID has changed and needs to be included in the installation ID to update the activation authority database. An example of this scenario is when the customer upgrades his computer hardware after obtaining the backend license. Therefore, for these instances, the H/W ID, license ID and issue date are included in the installation ID.

Dropped License Scenario

A dropped license scenario is when a user sends a license request to the activation authority, the request is processed, and a backend license is generated and logged to the activation authority database, but the backend license is not downloaded/deposited in the license store of the user's computer for some reason (e.g., communication error while downloading backend license, no disk space on the client, etc.)

In an embodiment of the present invention, the user will be able to recover/re-download the same backend license online in most cases. The basic idea is to correctly identify the user when he connects to the activation authority again. This identification is achieved by using a combination of the server generated unique key (GUID) for each session and a request acknowledgement mechanism. The user will be redirected to a customer service representative (CSR) if the user's credentials cannot be authenticated online.

It should be understood that the backend license typically will not be uninstalled if the software product is uninstalled. Therefore, if the count mechanism allows, a user may uninstall and reinstall the software product on the same computer without having to contact a customer service representative.

We claim:

1. A computer-implemented method for activating an electronic product and installing the electronic product on a computer, comprising the steps of:
    obtaining a local license from a storage medium of the electronic product and storing the local license with the electronic product on the computer by inputting a product key and obtaining the local license,
    determining a license type and an installation ID for the electronic product, wherein the installation ID comprises a product ID (PID);
    transmitting the installation ID to an activation authority;

at the activation authority, determining whether the PID has been previously used to activate the software product;

if the PID is determined not to have been previously used more than a predetermined number of times to activate the electronic product, determining a backend license to grant and transmitting the backend license to the computer to be stored on the computer; and if the determined previous use of the PID exceeds the predetermined number, transmitting an indication to the computer that installation of the electronic product was not successful.

2. The method as in claim 1, wherein:

the local license includes information for granting one of a plurality of license types for the software product; and the type of backend license granted depends on the information from the local license.

3. The method of claim 2 wherein the product key comprises a channel ID and wherein the storage medium is searched for the corresponding local license corresponding to the channel ID.

4. The method of claim 3 wherein the local license comprises a vendor installation ID, a channel ID range for each supported license type, a license type for each channel ID range, and an optional product expiration date for the license type.

5. The method of claim 4 wherein the license type is determined by searching for the product key's channel ID in the local license's channel ID range.

6. The method of claim 5 wherein the installation ID further comprises a hardware ID (H/W ID) describing the hardware of the computer.

7. The method of claim 6 wherein the activation authority uses the channel ID to determine the type of backend license to grant.

8. A computer-implemented method for activating an electronic product and installing the electronic product on a computer, comprising the steps of:

obtaining a local license from a storage medium of the electronic product and storing the local license with the electronic product on the computer by inputting a product key and obtaining the local license, wherein the local license allows for one of a plurality of license types to be activated from the software product;

determining a license type and an installation ID for the electronic product, wherein the installation ID comprises a product ID (PID);

transmitting the installation ID to an activation authority;

at the activation authority, determining whether the PID has been previously used to activate the software product and determining the type of backend license to grant; and if grant of a backend license is determined, transmitting the backend license to the computer and storing the backend license on the computer to enable activation of the electronic product on the computer.

9. The method of claim 8, wherein the type of backend license to grant depends on information in the PID and transmitted to the activation authority.

10. The method of claim 8, wherein the product key comprises a channel ID and wherein the storage medium is searched for the corresponding local license corresponding to the channel ID.

11. A system for activating an electronic product, the system comprising:

a memory storage; and a processing unit coupled to the memory storage, wherein the processing unit is operative to:

receive, from a computer, an installation ID comprising a product ID (PID), a license type and the installation ID for the electronic product being determined at the computer, a local license being obtained from a storage medium of the electronic product and the local license being stored with the electronic product on the computer by inputting a product key and obtaining the local license, determine whether the PID has been previously used to activate the software product, if the PID is determined not to have been previously used more than a predetermined number of times to activate the electronic product, determine a backend license to grant and transmit the backend license to the computer to be stored on the computer, and if the determined previous use of the PID exceeds the predetermined number, transmit an indication to the computer that installation of the electronic product was not successful.

12. The system as in claim 11, wherein:

the local license includes information for granting one of a plurality of license types for the software product; and the type of backend license granted depends on the information from the local license.

13. The system of claim 11, wherein the product key comprises a channel ID and wherein the storage medium of the electronic product is searched for the corresponding local license corresponding to the channel ID.

14. The system of claim 11, wherein the local license comprises a vendor installation ID, a channel ID range for each supported license type, a license type for each channel ID range, and an optional product expiration date for the license type.

15. The system of claim 14, wherein the license type is determined by searching for the product key's channel ID in the local license's channel ID range.

16. The system of claim 14, wherein the vendor installation ID further comprises a hardware ID (H/W ID) describing the hardware of the computer.

17. The system of claim 16, wherein the activation authority uses the channel ID to determine the type of backend license to grant.

* * * * *